(12) United States Patent
Bedekar et al.

(10) Patent No.: US 9,357,586 B2
(45) Date of Patent: May 31, 2016

(54) METHOD AND APPARATUS TO FACILITATE MOBILE STATION COMMUNICATIONS USING INTERNET PROTOCOL-BASED COMMUNICATIONS

(75) Inventors: Anand S. Bedekar, Arlington Heights, IL (US); Rajeev Agrawal, Northbrook, IL (US); Venkat Gopikanth, Buffalo Grove, IL (US); Suresh Kalyanasundaram, Bangalore (IN); Vishnu Ram Ov, Trivandrum (IN)

(73) Assignee: Google Technology Holdings LLC, Mountain View, CA (US)

( * ) Notice: Subject to any disclaimer, the term of this patent is extended or adjusted under 35 U.S.C. 154(b) by 884 days.

(21) Appl. No.: 11/913,944

(22) PCT Filed: Jun. 19, 2006

(86) PCT No.: PCT/US2006/023732
§ 371 (c)(1),
(2), (4) Date: Nov. 9, 2007

(87) PCT Pub. No.: WO2007/001954
PCT Pub. Date: Jan. 4, 2007

(65) Prior Publication Data
US 2008/0240037 A1    Oct. 2, 2008

(30) Foreign Application Priority Data
Jun. 21, 2005   (IN) .............................. 539/KOL/2005

(51) Int. Cl.
*H04W 92/02* (2009.01)
*H04W 36/00* (2009.01)
(Continued)

(52) U.S. Cl.
CPC .......... *H04W 92/02* (2013.01); *H04W 36/0011* (2013.01); *H04W 36/14* (2013.01); *H04W 80/00* (2013.01)

(58) Field of Classification Search
USPC .......... 370/328, 331, 338, 401, 352; 455/436, 455/438
See application file for complete search history.

(56) References Cited

U.S. PATENT DOCUMENTS 5,506,838 A    4/1996   Flanagan
6,195,555 B1   2/2001   Dent
(Continued)

FOREIGN PATENT DOCUMENTS

DE    10111493 A1    9/2002
EP    0777396 A1    6/1997
(Continued)

OTHER PUBLICATIONS

Wikipedia Article from Internet: "Global System for Mobile Communications", Apr. 17, 2005, http://web.archive.org/web/20050417021658/http://de.wikipedia.org/wiki/Global_System_for_Mobile_Communications, Mar. 27, 2008, pp. 1-13.
(Continued)

*Primary Examiner* — Donald Mills
*Assistant Examiner* — Henry Baron
(74) *Attorney, Agent, or Firm* — Faegre Baker Daniels LLP

(57) ABSTRACT

In a communication network (400), wireless access points (300) utilize one or more agents (302, 306) to support the operating needs of corresponding mobile stations. Pursuant to one approach, the agent supports translation of the mobile station's end-to-end protocol-based messages to Internet Protocol-based messages that are readily ported through an Internet Protocol-friendly communication system infrastructure that preferably eschews the use of network elements that rely upon unique and/or proprietary non-Internet Protocol interfaces. Pursuant to another approach the wireless access point is able to interact on a peer-to-peer basis with other wireless access points in order to facilitate, for example, handovers and other mobility management tasks.

14 Claims, 5 Drawing Sheets

(51) Int. Cl.
H04W 36/14 (2009.01)
H04W 80/00 (2009.01)

(56) References Cited

U.S. PATENT DOCUMENTS

| | | | |
|---|---|---|---|
| 6,230,012 B1 | 5/2001 | Willkie et al. | |
| 6,285,880 B1 | 9/2001 | Gagnon et al. | |
| 6,430,698 B1 | 8/2002 | Khalil et al. | |
| 6,473,413 B1 | 10/2002 | Chiou et al. | |
| 6,567,664 B1 | 5/2003 | Bergenwall et al. | |
| 6,578,085 B1 | 6/2003 | Khalil et al. | |
| 6,701,361 B1 | 3/2004 | Meier | |
| 6,711,408 B1 | 3/2004 | Raith | |
| 6,721,565 B1* | 4/2004 | Ejzak et al. | 455/436 |
| 6,795,857 B1 | 9/2004 | Leung et al. | |
| 6,795,891 B2 | 9/2004 | Lin | |
| 6,813,501 B2 | 11/2004 | Kinnunen et al. | |
| 6,859,653 B1 | 2/2005 | Ayoub et al. | |
| 6,977,938 B2 | 12/2005 | Alriksson et al. | |
| 7,016,682 B2 | 3/2006 | Won et al. | |
| 7,096,273 B1 | 8/2006 | Meier | |
| 7,139,833 B2 | 11/2006 | Heller | |
| 7,162,529 B2* | 1/2007 | Morishige et al. | 709/230 |
| 7,289,463 B2 | 10/2007 | Ozugur | |
| 7,336,670 B1 | 2/2008 | Calhoun et al. | |
| 7,349,380 B2 | 3/2008 | Barker, Jr. et al. | |
| 7,450,544 B2 | 11/2008 | Rue | |
| 7,486,670 B2 | 2/2009 | Kinoshita et al. | |
| 7,512,687 B2 | 3/2009 | Jung | |
| 7,606,194 B2 | 10/2009 | He | |
| 7,649,866 B2 | 1/2010 | Chari et al. | |
| 7,733,829 B2 | 6/2010 | Lee et al. | |
| 7,860,067 B2 | 12/2010 | Na et al. | |
| 2001/0024443 A1 | 9/2001 | Alriksson et al. | |
| 2002/0009066 A1 | 1/2002 | Shimizu et al. | |
| 2002/0015395 A1 | 2/2002 | Karagiannis | |
| 2002/0015396 A1 | 2/2002 | Jung | |
| 2002/0021680 A1 | 2/2002 | Chen | |
| 2002/0026527 A1 | 2/2002 | Das et al. | |
| 2002/0034166 A1 | 3/2002 | Barany et al. | |
| 2002/0046287 A1 | 4/2002 | La Porta et al. | |
| 2002/0057657 A1 | 5/2002 | LaPorta et al. | |
| 2002/0075844 A1 | 6/2002 | Hagen | |
| 2002/0080752 A1 | 6/2002 | Johansson et al. | |
| 2002/0090940 A1 | 7/2002 | Chen et al. | |
| 2002/0094813 A1 | 7/2002 | Koshimizu et al. | |
| 2003/0016655 A1 | 1/2003 | Gwon | |
| 2003/0018810 A1 | 1/2003 | Karagiannis et al. | |
| 2003/0035387 A1 | 2/2003 | Kim et al. | |
| 2003/0076837 A1 | 4/2003 | Whitehill et al. | |
| 2003/0104813 A1 | 6/2003 | Julka et al. | |
| 2003/0148777 A1 | 8/2003 | Watanabe et al. | |
| 2003/0174709 A1 | 9/2003 | Shankar | |
| 2003/0202505 A1 | 10/2003 | Ozugur | |
| 2003/0235176 A1 | 12/2003 | Zhang et al. | |
| 2004/0005884 A1 | 1/2004 | Nieminen et al. | |
| 2004/0013099 A1 | 1/2004 | O'Neill | |
| 2004/0022212 A1 | 2/2004 | Chowdhury et al. | |
| 2004/0023653 A1 | 2/2004 | O'Neill | |
| 2004/0024901 A1 | 2/2004 | Agrawal et al. | |
| 2004/0034705 A1 | 2/2004 | Focsaneanu | |
| 2004/0043791 A1 | 3/2004 | Reddy | |
| 2004/0047322 A1 | 3/2004 | O'Neill | |
| 2004/0063455 A1 | 4/2004 | Eran et al. | |
| 2004/0066760 A1 | 4/2004 | Thubert et al. | |
| 2004/0071109 A1 | 4/2004 | Herle et al. | |
| 2004/0082330 A1 | 4/2004 | Marin | |
| 2004/0114559 A1 | 6/2004 | Wang | |
| 2004/0185852 A1 | 9/2004 | Son et al. | |
| 2004/0213181 A1 | 10/2004 | Grech et al. | |
| 2004/0213260 A1 | 10/2004 | Leung et al. | |
| 2004/0242233 A1 | 12/2004 | Lutgen | |
| 2004/0259567 A1 | 12/2004 | Valko et al. | |
| 2005/0047399 A1* | 3/2005 | Lee et al. | 370/352 |
| 2005/0088994 A1 | 4/2005 | Maenpaa et al. | |
| 2005/0113091 A1 | 5/2005 | Rodriguez et al. | |
| 2005/0122946 A1 | 6/2005 | Won | |
| 2005/0128975 A1 | 6/2005 | Kobayashi et al. | |
| 2005/0135286 A1* | 6/2005 | Nurminen et al. | 370/310 |
| 2005/0135422 A1 | 6/2005 | Yeh | |
| 2005/0148368 A1 | 7/2005 | Scheinert et al. | |
| 2005/0163080 A1 | 7/2005 | Suh et al. | |
| 2005/0180372 A1 | 8/2005 | Cho et al. | |
| 2005/0185632 A1 | 8/2005 | Draves et al. | |
| 2005/0213546 A1* | 9/2005 | Reitter et al. | 370/338 |
| 2005/0232286 A1 | 10/2005 | Lee et al. | |
| 2006/0104247 A1 | 5/2006 | Dommety et al. | |
| 2006/0112183 A1 | 5/2006 | Corson et al. | |
| 2006/0142034 A1 | 6/2006 | Wentink et al. | |
| 2006/0193272 A1 | 8/2006 | Chou et al. | |
| 2007/0115883 A1 | 5/2007 | Narayanan et al. | |
| 2008/0167037 A1 | 7/2008 | Bedekar et al. | |
| 2008/0186964 A1 | 8/2008 | Bedekar et al. | |
| 2008/0192663 A1 | 8/2008 | Bedekar et al. | |
| 2008/0194271 A1 | 8/2008 | Bedekar et al. | |
| 2008/0205362 A1 | 8/2008 | Bedekar et al. | |
| 2008/0212562 A1 | 9/2008 | Bedekar et al. | |

FOREIGN PATENT DOCUMENTS

| | | |
|---|---|---|
| EP | 1259026 A1 | 11/2002 |
| EP | 1404143 A2 | 3/2004 |
| EP | 1263182 B1 | 12/2008 |
| WO | 0045560 | 8/2000 |
| WO | 03049377 A1 | 6/2003 |
| WO | 2004073324 A2 | 8/2004 |
| WO | 2004073325 A2 | 8/2004 |
| WO | 2007001948 A2 | 1/2007 |

OTHER PUBLICATIONS

Chuah, M.C. et al.: Mobile Virtual Private Dial-up Services:, Bell Labs Technical Journal; Bell Laboratories; U.S., vol. 4, No. 3, Jul. 1999, pp. 51-72.

Perkins, Charles et al: "IMHP: A Mobile Host Protocol for the Internet", in Proceedings of INET'94/JENC5, (1994), all pages.

Wu, Chun-Hsin et al.: "Bi-direction Route Optimization in Mobile IP over Wireless LAN", Vehicular Technology Conference, 2002, Proceedings. VTC 2002-Fall, 2002 IEEE 56th, all pages.

Perkins, C.: "IP Mobility Support for IPv4", Network Working Group, Request for Comments: 3344, Nokia Research Center, Aug. 2002, all pages.

R. Caceres and V.N. Padmanbhan: "Fast and Scalable Wireless Handoffs in Support of Mobile Internet Audio", ACM J. Mobile Net. and Appl., v3, No. 4, Dec. 1998, all pages.

Gustafsson Eva et al.: "Mobile IPv4 Regional Registration", draft-ietf-mobileip-reg-tunnel-09.txt, Mobile IP Working Group Internet Draft, Jun. 25, 2004, all pages.

Ericsson, "Low Latency Handoffs in Mobile IPv4", Network Working Group, Internet-Draft, Expires Dec. 2004, Jun. 2004, draft-ieff-mobileip-lowlatency-handoffs-v4-09.txt, all pages.

Soliman, Hesham et al.: Hierarchical Mobile IPv6 Mobility management (HMIPv6), draft-ietf-mipshop-hmipv6-03.txt, Network Working Group, Expires: Apr. 2005, Oct. 2004, all pages.

Kempf, James et al.: "Post-handover Mobile Initiated Tunneling for Fast Mobile IPv4 Handover", draft-kempf-mobileip-postmit-handover-00.txt, Expires: Jun. 2002, all pages.

Fathi, Hanane et al.: "Mobility Management for VoIP in 3G Systems: Evaluation of Low-Latency Handoff Schemes", IEEE Wireless Communications, Apr. 2005, 1536-1284/05, pp. 96-104.

Perkins, C: "IP Mobility Support", Network Working Group, Request for Comments: 2002 IBM, Oct. 1996, all pages.

Translation of the Official Communication from the German Patent and Trademark Office date Aug. 19, 2011, all pages.

German Patent and Trademark Office, Office Action for German Patent Application No. 10 2006 001 710.1 dated Sep. 6, 2012, 8 pages.

Andy Wilton, "The Benefits of ALL-IP Networks", Presentation for the 3G Mobile Summit, Brussels, Jun. 2001. http://ipv6tf.org/PublicDocuments/ThebenefitsofALL-IPnetworks.pdf [accessed on Aug. 16, 2012].

(56) References Cited

OTHER PUBLICATIONS

Ramjee, R. et al. "IP-base access network infrastructure for next-generation wireless data networks", Personal Communications, IEEE, vol. 7 (4) 34-41, Aug. 2000; DOI:10.1109/98.863994.

Ulrich Trick et al. "Modeling heterogeneous telecommunications networks" ITG Technical Report, Presentation at the 10th ITG Symposium from Jun. 1, 2005 to Jun. 2, 2005 in Osnabrück, p. 41-49, Jun. 2005.

United States Patent and Trademark Office, "Non-Final Rejection" for U.S. Appl. No. 11/913,942 dated Nov. 28, 2012, 16 pages.

United States Patent and Trademark Office, "Non-Final Rejection" for U.S. Appl. No. 11/913,939 dated May 6, 2014, 14 pages.

United States Patent and Trademark Office, "Non-Final Rejection" for U.S. Appl. No. 11/913,939 (CE14029R) dated Aug. 21, 2014, 15 pages.

United States Patent and Trademark Office, "Decision on Appeal" for U.S. Appl. No. 11/913,936 (CE14027R) dated Feb. 4, 2015, 6 pages.

United States Patent and Trademark Office, Non-Final Rejection for U.S. Appl. No. 11/913,936 (related to above-captioned patent application), mailed Jul. 6, 2015.

German Patent and Trademark Office, Summons before the German Patent and Trademark Office for German Patent Application No. 10 2006 001 710.1 (related to above-captioned patent application), mailed Jan. 28, 2016.

Venken, Kristiaan et al., "Analysis of the evolution to an IP-based UMTS terrestrial radio access network," Wireless Communications, IEEE, Oct. 2003, 10th issue, No. 5, pp. 46-53.

De Vriendt, J. et al., "Mobile network evolution: A revolution on the move," IEEE Communications Magazine, Apr. 2002.

\* cited by examiner

METHOD AND APPARATUS TO FACILITATE MOBILE STATION COMMUNICATIONS USING INTERNET PROTOCOL-BASED COMMUNICATIONS

RELATED APPLICATIONS

This application relates to the following patent applications as were filed on even date herewith (wherein the contents of such patent applications are incorporated herein by this reference):

METHOD AND APPARATUS TO FACILITATE COMMUNICATIONS USING SURROGATE AND CARE-OF INTERNET PROTOCOL ADDRESSES, application Ser. No. 11/913,939, filed Nov. 9, 2007;

METHOD AND APPARATUS FOR REDUCING LATENCY DURING WIRELESS CONNECTIVITY CHANGES, application Ser. No. 11/913,936, field Nov. 9, 2007;

ADDRESS RESOLUTION PROTOCOL-BASED WIRELESS ACCESS POINT METHOD AND APPARATUS, application Ser. No. 11/913,940, filed Nov. 9, 2007 (now U.S. Pat. No. 8,160,067);

METHOD, APPARATUS, AND SYSTEM FOR ESTABLISHING A DIRECT ROUTE BETWEEN AGENTS OF A SENDER NODE AND A RECEIVER NODE application Ser. No. 11/913,935, filed Nov. 9, 2007 (now U.S. Pat. No. 8,144,687);

SYSTEM AND METHOD FOR PROVIDING A DISTRIBUTED VIRTUAL MOBILITY AGENT, application Ser. No. 11/913,937, filed Nov. 9, 2007 (now U.S. Pat. No. 8,195,807); and SYSTEM AND METHOD FOR PAGING AND LOCATION UPDATE IN A NETWORK, application Ser. No. 11/913,942, filed Nov. 9, 2007.

TECHNICAL FIELD

This invention relates generally to communications networks and more particularly to wireless communications.

BACKGROUND

One-way and two-way wireless communications are a relatively well-understood area of endeavor. In many cases, various network elements comprise an infrastructure that support the communications needs of one or more mobile stations. These communications needs can comprise voice calls, data communications, and so forth. In many cases, modern communications networks comprise a large number of geographically differentiated wireless access points that essentially define the network's edge. Such geographic differentiation, in turn, facilitates significant reuse of various network resources such as radio frequency bearer channels, control channels, time slots, spreading codes, and so forth. Aggressive reuse of such resources then facilitates viably supporting a relatively large user population.

Such communication networks, however, have become ever more complex. Geographically parsed points of access, coupled with ever growing functionality and capability, has driven increasingly complex corresponding network architecture and internal operations. As a result, a typical communication network having geographically differentiated wireless access points also usually hosts a plurality of network elements that are hierarchically differentiated from those wireless access points. (Hierarchical differentiation, in part, permits a given network element to service the needs of a corresponding plurality of wireless access points.)

Such hierarchically differentiated network elements serve a variety of important and/or necessary functions. Some illustrative examples include:

Connected mode mobility (for example, handover of a presently communicating mobile station from one wireless access point to another);

Idle mode mobility (for example, supporting and effecting location updates for and/or paging of supported mobile stations);

Subscriber and call session management (for example, authentication, authorization, and accounting services, policy administration, and so forth);

Radio frequency resource management (for example, resource scheduling, admission control, dynamic quality of service management, load balancing, and so forth);

to name but a few.

Unfortunately, while such an architectural approach indeed successfully supports the intended service capability, there are issues of concern. Network elements capable of successfully operating in a given network are typically large centralized special purpose platforms bearing a relatively high cost. (Relevant examples include Packet Data Serving Nodes, Serving General Packet Radio Service Support Nodes, Gateway General Packet Radio Service Support Nodes, and so forth.)

Furthermore, in many cases, these network elements use relatively unique end-to-end protocols in order to permit useful communications between themselves and all necessary counterpart network elements as well as mobile stations. (Relevant examples include Radio Resource Control protocols, Non-Access Stratum protocols, CDMA 1X air interface protocols, and so forth.)

In combination, the above considerations tend to present scaling difficulties and barriers to feature growth and expansion. The end result represents increased costs (both for service providers and for subscribers) as pertain both to the infrastructure and to the mobile stations themselves, rapid obsolescence, and/or delayed expansion or upgrades with respect to capacity and/or features.

BRIEF DESCRIPTION OF THE DRAWINGS

The above needs are at least partially met through provision of the method and apparatus to facilitate mobile station communications using Internet Protocol-based communications described in the following detailed description, particularly when studied in conjunction with the drawings, wherein.

Figure 1:
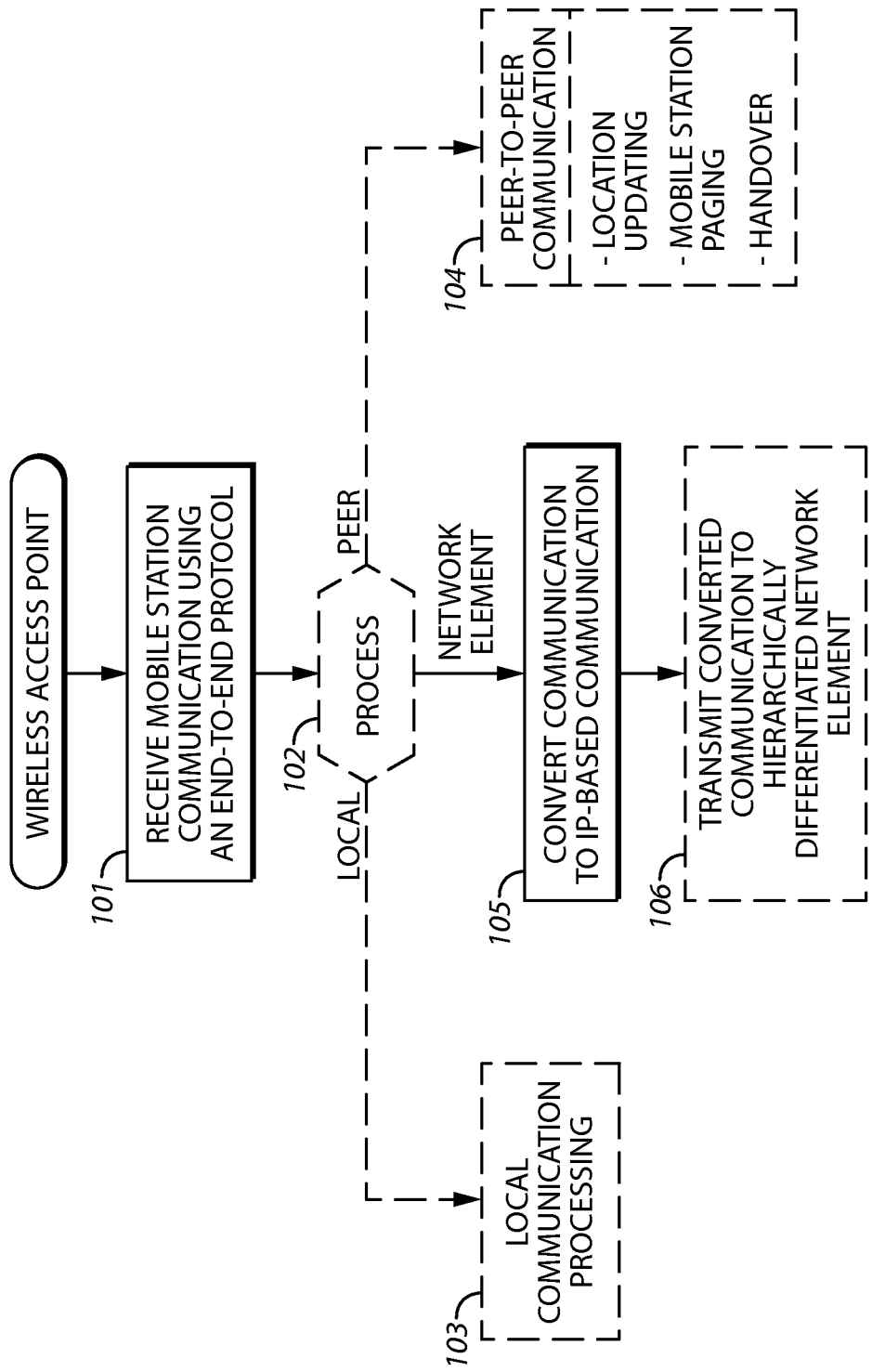
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/ or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the arts will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, these embodiments are suitable for use with a communication network having a plurality of geographically differentiated wireless access points and which communication network supports, for example, handovers of mobile stations from one wireless access point to another wireless access point during both idle and connected modes of operation in order to support mobile station mobility. More particularly, these embodiments are useful when applied in a setting where one or more mobile stations use a plurality of wireless protocols and wherein at least one of these comprises an end-to-end protocol originally intended to facilitate and support communicating directly with a counterpart network element that is hierarchically differentiated from the wireless access points.

In general, these embodiments preferably support reception, at such a wireless access point, of a communication from a mobile station that uses an end-to-end protocol and conversion (preferably at that wireless access point) of that communication from the end-to-end protocol to an Internet Protocol-based communication (such as, but not limited to, an IPv4 or IPv6-based communication) to provide a resultant converted communication. The latter, in turn, can then be subsequently transmitted to, for example, a hierarchically differentiated network element using an Internet Protocol.

Those skilled in the art will appreciate that network elements using an Internet Protocol-compatible communications interface are considerably more available, are often less expensive, and tend to have far more open architectures, than the existing wireless technology specific network elements that presently serve communication network needs.

In a preferred approach, such a wireless access point has an ability and opportunity to conduct peer-to-peer communications with other wireless access points. This capability, in turn, preferably serves to facilitate such services as location updating (as corresponds to individual mobile stations as are served by the network, mobile station paging, and even handover effectuation) without additional need for network elements hierarchically differentiated from the access points.

So configured, a communication network can be largely configured using relatively inexpensive and readily available network element components. These teachings are readily scalable and will accommodate a wide variety of user base sizes, coverage areas, and present and future features and functionality. Furthermore, these teachings, when deployed, permit continued compatible operation with legacy mobile stations with essentially no change or modification to the functionality or operation of the mobile station being required. In effect, the mobile stations are able to continue to function as though the communication network remained configured in a pre-deployment architectural state.

These and other benefits may become clearer upon making a thorough review and study of the following detailed description. Referring now to the drawings, and in particular to FIG. 1, a wireless access point as comprises a part of a communication network, such as, but not limited to, a Universal Mobile Telecommunications System (UMTS) network, a Global System for Mobile communication (GSM) network, a Code Division Multiple Access (CDMA) network, any I.E.E.E. 802.xx-compatible network, or indeed any number of other wireless communication networks, and wherein the communication network itself comprises a plurality of geographically differentiated wireless access points and which communication network supports handovers of mobile stations from one wireless access point to another wireless access point during both idle and connected modes of operation in order to support mobile station mobility. Each wireless access point of the plurality of wireless access points can effect a process 100 wherein, upon receiving 101 a communication from one of the mobile stations that uses an end-to-end protocol as described above, the wireless access point can optionally select 102 an appropriate responsive action as selected from an optional plurality of potentially available responsive actions.

These responsive actions may comprise local communication processing 103 (when, for example, the wireless access point has sufficient native capability and information to permit a local response), peer-to-peer communications 104 with one or more other wireless access points of the communication network (to facilitate, for example, effecting location updating as corresponds to a mobile station, mobile station paging (to facilitate, for example, locating or confirming a present location of a mobile station within the communication network), and/or a handover of a given mobile station from one wireless access point to another wireless access point, to name a few), and forwarding of at least a portion of the communication to a generic wireless agnostic network element (including but not limited to a router) within the communication network.

When the communication uses an end-to-end protocol, such as a Radio Resource Control (RRC)-compatible protocol or a Non-Access Stratum (NAS) (such as Universal Mobile Telecommunications System (UMTS), Code Division Multiple Access (CDMA) or 802.xx) compatible protocol as are known in the art, this forwarding preferably comprises converting 105 the communication from the end-to-end protocol to an Internet Protocol-based communication (using, for example, Internet protocol version 4) to provide a converted communication that is then optionally but preferably transmitted 106 to a generic wireless agnostic network element for appropriate processing and resultant action. The details with respect to such conversion will of course vary from one wireless protocol to another but will typically comprise unpacking and/or parsing of the contents of the original communication and repacking that content into one or more corresponding data packets having the selected Internet Protocol format. As such conversions are well within the expertise of those skilled in the art, and further as these teachings are not overly dependent upon the preferential use of any particular conversion technique, additional details regarding such conversion will not be provided here for the sake of brevity and the preservation of narrative focus.

So configured, a wireless access point can either locally handle a communication from a mobile station, cooperate directly with a peer wireless access point to facilitate any requirements necessitated by the communication, or forward the substance of the communication on within the network to an alternative hierarchical level using a familiar and nearly ubiquitous communication protocol regardless of having received that communication from the mobile station in a wireless protocol originally intended for use with a given corresponding dedicated purpose network element that may no longer even be available within the communication network.

Figure 2:
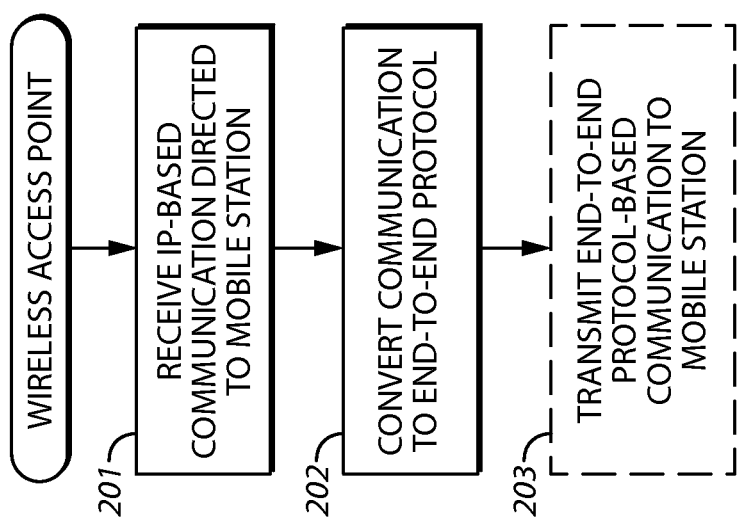
FIG. 2 comprises a flow diagram as configured in accordance with various embodiments of the invention.

With reference to FIG. 2, a similar conversion process can be used when the wireless access point receives a communication that is directed to the mobile station, which communication derives from a network element that uses an Internet Protocol to effect the communication. In particular, pursuant to a preferred approach 200, upon receiving 201 such a communication, the wireless access point can convert 202 the communication from an Internet Protocol to a communication that uses an end-to-end protocol as may be expected by the mobile station. The wireless access point can then transmit 203 this converted end-to-end protocol-based communication to the mobile station using the supported wireless link.

For example, the mobile station may have used a given end-to-end protocol to source a communication to a given network element to seek a specific kind of functional authorization. As per the above teachings, the wireless access point will have converted that communication from the end-to-end protocol to an Internet Protocol-based communication and then transmitted that converted communication to a corresponding network element for appropriate handling. The latter, upon providing the requested authorization, will provide that authorization using, again, the Internet Protocol of choice. Upon receiving this response, the wireless access point will then convert the authorization message from an Internet Protocol format to the end-to-end protocol used by the mobile station when making the original request. So configured, the mobile station receives desired or necessary services in a manner that requires no alteration or modification of the mobile station notwithstanding that the sought after network element may no longer even be a part of the communication network and the end-to-end protocol may no longer be otherwise supported within the communication network.

Those skilled in the art will recognize and understand that the processes described above with respect to FIGS. 1 and 2 are applicable with respect to reverse communication flows. For example, as described and for the purpose of illustration, the options and responses set forth in FIG. 1 are potentially set in motion by receipt of a mobile station communication. Much the same can result, however, upon receipt of a communication intended for the mobile station. As one specific example, a given network element may transmit a page intended for a given mobile station. The peer-to-peer communication 104 described in FIG. 1 can serve to facilitate this page. In a similar fashion, such peer-to-peer communications can also be used as appropriate to supplement the process set forth in FIG. 2.

Figure 3:
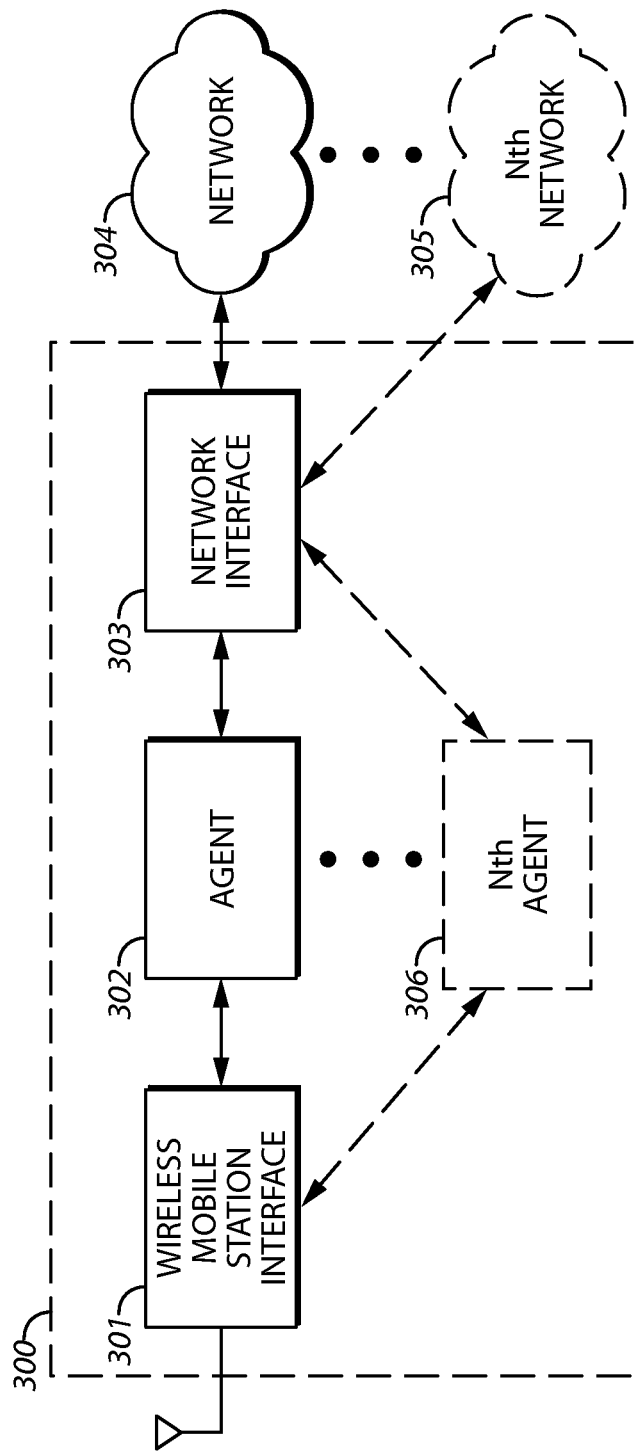
FIG. 3 comprises a block diagram as configured in accordance with various embodiments of the invention.

Those skilled in the art will appreciate that such a wireless access point can be realized in any of a wide variety of ways (including through use of physically distributed configurations, centralized and integrated platforms, and so forth). As an illustrative example only and without intending to limit the solution space, a given wireless access point 300 will now be described with reference to FIG. 3.

Pursuant to a preferred configuration, the wireless access point 300 comprises a wireless mobile station interface 301 that operably couples to at least one agent 302 (and optionally up to any number of agents as represented by an Nth agent 306 in the illustration). The wireless mobile station interface 301 supports the wireless link between the communication network and the mobile stations. Accordingly, the wireless mobile station interface 301 will itself vary considerably from system to system with respect to radio frequency usage and allocation, modulation, supported protocols, power control, encryption, error coding, and so forth. Such characteristics and their supporting components are well understood in the art and require no further elaboration here.

The agent 302 (or agents 306) operably couples to the wireless mobile station interface 301 as mentioned above and also operably couples to a network interface 303. The network interface 303 preferably has an Internet Protocol-compatible output that operably couples to the communication network 304 (or, possibly, multiple networks as represented by the Nth network 305 depicted in the illustration). As alluded to earlier, this network interface 303 serves as a mechanism to facilitate the transmission of converted-protocol communication to generic network elements using an Internet Protocol, and peer-to-peer interaction with other access points. In a similar fashion, the network interface 303 also preferably serves as a mechanism for receiving an Internet Protocol-based communication from a network element, wherein the communication is directed to a mobile station that is linked to the communication network via the wireless access point 300.

The agents identified above can be configured as desired to support any of a variety of appropriate functions. For example, pursuant to one approach, at least one such agent can comprise a mobility agent having, for example, network-side data-rerouting programming, wireless access point peer-to-peer mobility support programming, and so forth. So configured, the mobility agent can readily serve to facilitate, for example, mobile station location updates and/or mobile station paging. More particularly, in a preferred approach, these capabilities are based, at least in part, on peer-to-peer interactions between this wireless access point 300 and at least one other wireless access point (not shown). In a similar vein, if desired, one such agent can comprise a handover agent to facilitate a handover of a mobile station to another wireless access point (or to accept a handover of a mobile station from another wireless access point) via, again, peer-to-peer interaction with a counterpart wireless access point.

As another example of the flexibility and breadth of these teachings, if desired, one such agent can comprise a voice call agent having, for example, Session Initiation Protocol (SIP) voice call setup programming, Session Initiation Protocol-to-over-the-air conversion of voice call control messages programming, Voice over Internet Protocol (VoIP) voice frame packing programming, Voice over Internet Protocol voice frame unpacking programming, and so forth as may be appropriate to the needs of a given application. For example, in a preferred approach a Voice over Internet Protocol gateway may use Session Initiation Protocol to seek to set up a Voice Over Internet Protocol voice call session (using an Internet Address for the mobile station as may be used, in a surrogate manner, by a corresponding wireless access point). In this case, the wireless access point agent can serve as a Session Initiation Protocol client that translates the Session Initiation Protocol call requests from the Voice over Internet Protocol gateway into over-the-air call setup messages that are understandable to the targeted mobile station.

In general, and in a preferred approach, the access points can employ a variety of techniques, including Mobile Internet Protocol-based tunneling techniques, to effect provision of Internet Protocol packets directed to a given Internet Protocol address to an appropriate wireless access point.

So configured, the agent (or agents) as are deployed with respect to a given wireless access point 300 can serve, for example, as mechanisms to convert communications received from or to be forwarded to a given mobile station to or from an Internet Protocol that is otherwise used for data transport within the communication network itself. This approach supports great flexibility and permits compatibility at the wireless access edge of the communication network for legacy and/or a wide variety of differently configured mobile stations.

Figure 4:
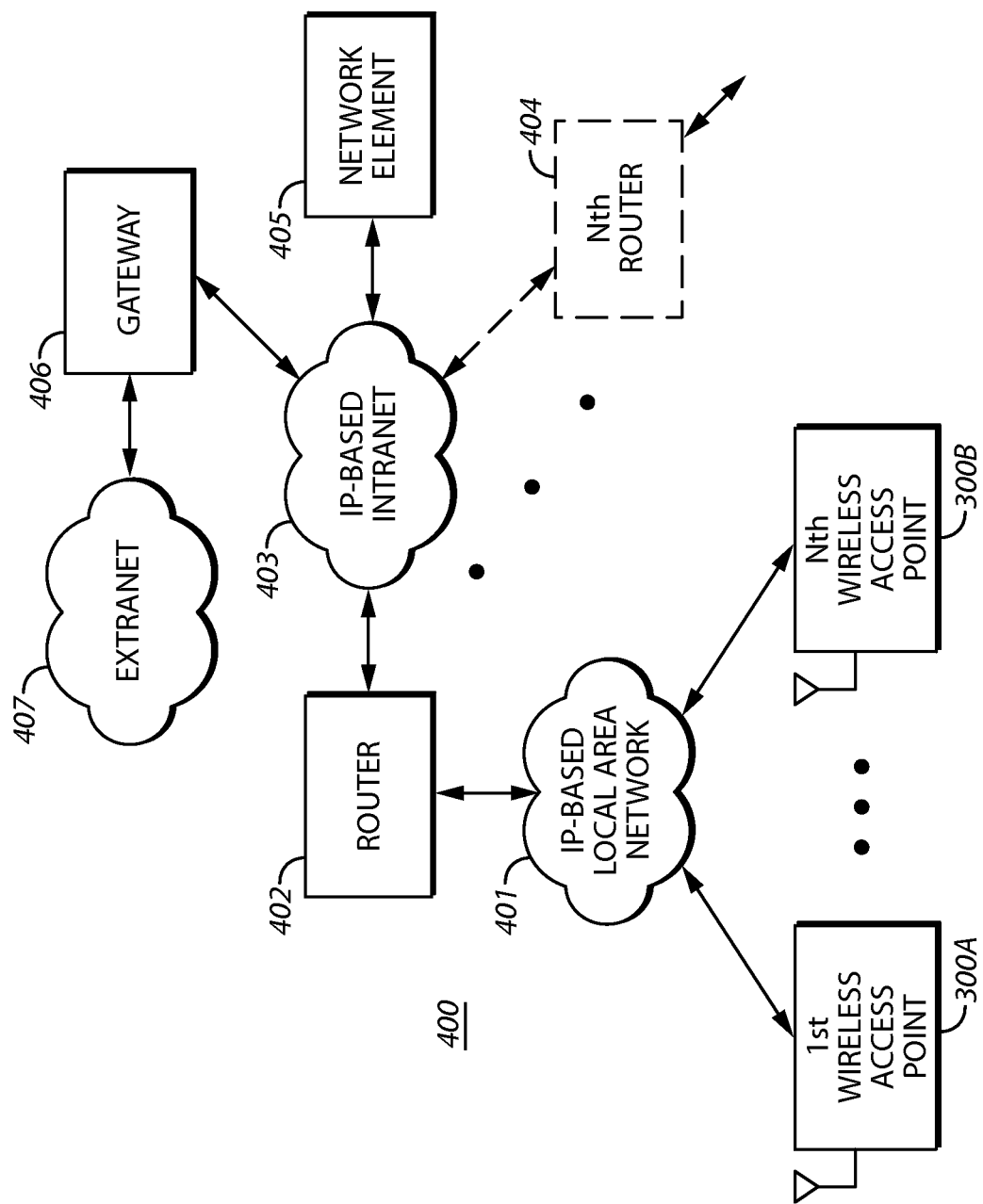
FIG. 4 comprises a block diagram as configured in accordance with various embodiments of the invention.

To further illustrate these points, and referring now to FIG. 4, the wireless access edge of a given communication system 400 can comprise a plurality of wireless access points (represented here by a first wireless access point 300A and an Nth wireless access point 300B). These wireless access points will typically be geographically distributed and serve different (though possibly overlapping) service coverage areas. Groups of these wireless access points are preferably operably coupled to an Internet Protocol-based local area network 401 in accordance with well understood prior art practice.

It is possible that, in a given communication network, only one such local area network 401 will be necessary but in many instances a given communication network will comprise a plurality of such local area networks (typically separated, in at least most cases, by some geographic distance). When multiple local area networks are provided, each will typically preferably serve a corresponding plurality of wireless access points. In some cases, when possible, it may be useful to connect a given wireless access point to more than one such local area network (to provide, for example, redundancy with respect to interaction between the communication network and that wireless access point).

In a preferred deployment, each such Internet Protocol-based local area network will itself operably couple to a router 402. Just as there may be multiple independent local area networks in a given communication system, there will also likely be multiple routers as represented in the illustration by an Nth router 404. These routers in turn couple, in a preferred configuration, to an Internet Protocol-based intranet 403 as is maintained by, for example, the communication network service provider and as are generally well understood in the art. In certain deployments, these routers 402 and 404, as well as additional routers on the intranet (not shown) may have Mobile Internet Protocol functionality that can be used to facilitate routing of Internet Protocol packets to the appropriate access points. This intranet 403 preferably serves, at least in part, to provide access to one or more network elements 405 (such as, for example, an Authentication, Authorization, and Accounting (AAA) server or a Home Subscriber Server (HSS), to name a few). This intranet 403 also preferably serves to provide access to one or more gateways 406 (such as a gateway to an extranet 407 such as the Internet as illustrated, a Voice over Internet Protocol gateway to a Public Switched Telephone Network (PSTN) (not shown) (wherein the Voice over Internet Protocol gateway would serve, for example, to provide the vocoding and decoding requirements of the VoIP process), a Signaling System (SS) 7 gateway to facilitate a link to a Home Location Register (HLR) (using, for example, Mobile Application Part (MAP)—a real time communication protocol often employed, for example, to transfer location information from a Visitor Location Register (VLR) to a Home Location Register) when an Internet Protocol-capable Home Subscriber Server is not otherwise available, and so forth.

Such a configuration can readily support the process steps described earlier. In particular, wireless access points can readily effect peer-to-peer communications and interactions via, for example, their local area network 401 and/or the communication network intranet 403 when necessary. This peer-to-peer relationship is preferably applied to handle essentially all wireless-specific functions including, for example, mobility management, handovers, paging, and so forth using peer-to-peer messaging (more particularly, those skilled in the art will appreciate that no Mobile Switch Center or Visitor Location Register support of mobility-related functionality is required given the described peer-to-peer approach). The wireless access points, upon converting an inbound message from a mobile station to an Internet Protocol-based communication, can similarly readily forward that communication on via the Internet Protocol-based architecture described. Importantly, these configurations are based upon liberal (or even exclusive) use of what essentially amount to standard off-the-shelf Internet Protocol network elements. This, in turn, greatly improves the outlook for reduced infrastructure costs while also tending to ease the way for future improvements and embellishments.

Those skilled in the art will understand and appreciate that the above teachings can be readily configured to support a wide variety of useful functions and features. A few illustrative examples will now be provided (with it being clearly understood that these examples comprise only a small non-exhaustive set of possibilities).

EXAMPLE 1

Figure 5:
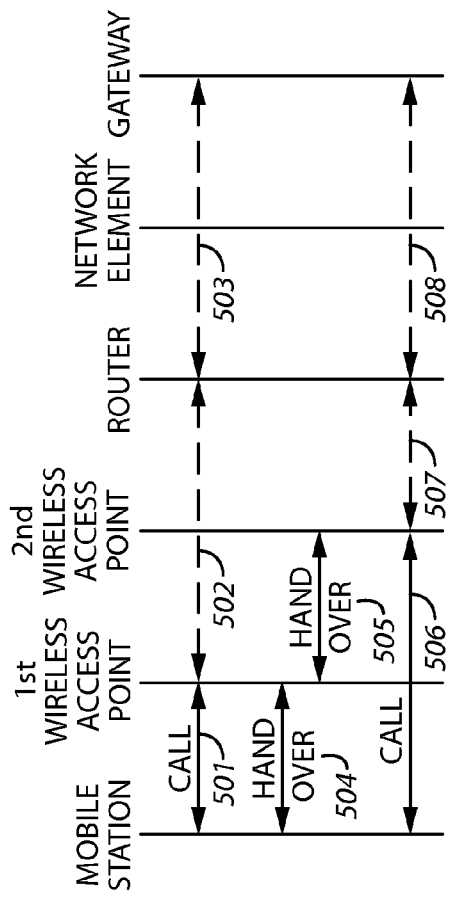
FIG. 5 comprises a signal flow diagram as configured in accordance with various embodiments of the invention.

In this first example, a mobile station is engaged in a data call. With reference to FIG. 5, this data call comprises a first portion 501 that uses a wireless link of choice between the mobile station and a first wireless access point. The latter then converts that data call into an Internet Protocol-based call as per the above description and forwards 502 the resultant Internet Protocol-based data call to a router within the communication network which then routes 503 the Internet Protocol-based data call to a gateway as per the above description. From there the data proceeds to its ultimate destination as determined by the mobile station.

In this example, the mobile station is moving during the call, and an in-call handover becomes necessary in order to maintain the call. The mobile station and the first wireless access point exchange communications 504 regarding the need and/or opportunity for a handover (depending upon the particular mode of handover being applied, the mobile station may also be independently communicating with a second wireless access point regarding the possibility of a handover as well). The first wireless access point then communicates 505 with a second wireless access point regarding the logistics of supporting the handover, with this peer-to-peer interaction being readily supported by the above-described embodiments.

Upon completing the handover, in part through the above-described facilitated peer-to-peer interaction between the wireless access points, the mobile station can continue its data call with the wireless portion 506 of the communication now being handled by the second wireless access point. The latter, in turn, works 507 in conjunction with the router to forward 508 the mobile station's data to the gateway and beyond.

EXAMPLE 2

Figure 6:
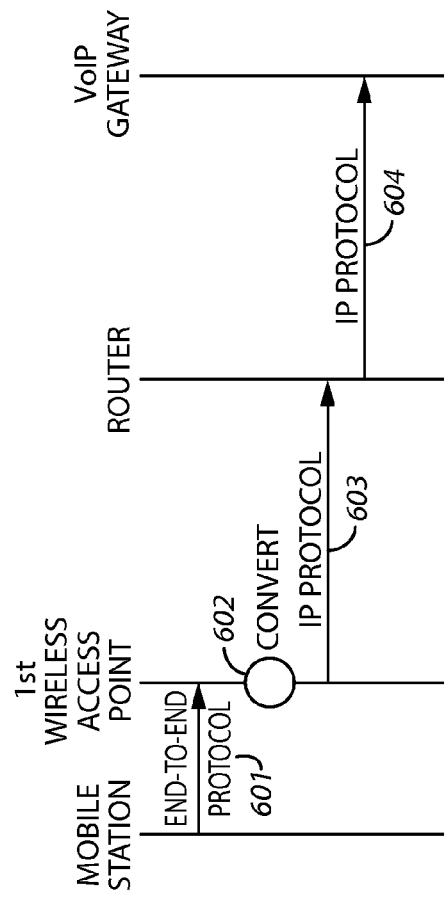
FIG. 6 comprises a signal flow diagram as configured in accordance with various embodiments of the invention.

Referring now to FIG. 6, in this example the mobile station is making a voice call using a corresponding end-to-end protocol 601. The receiving wireless access point converts 602 this communication from an end-to-end protocol-based communication to an Internet Protocol-based communication and sends a corresponding Internet Protocol transmission 603 to an available network router. The latter then further forwards the converted Internet Protocol-based data 604 to a Voice over Internet Protocol gateway where, for example, a connection to a Public Switched Telephone Network can be made in accordance with well understood prior art technique.

In this example it can be seen that a mobile station that is otherwise not capable of Voice over Internet Protocol calls is nevertheless able to effect exactly such a call. To achieve such a result, the wireless access point will preferably make use of a surrogate Internet Protocol address that corresponds to the mobile station, notwithstanding that the mobile station itself has no native use for such an address. This Internet Protocol address can be used (transparent to the mobile station) to facilitate, for example, the routing of Session Initiation Protocol call setup messages and Voice over Internet Protocol packets through the network to and from the wireless access point using, for example, known Mobile Internet Protocol techniques.

EXAMPLE 3

Figure 7:
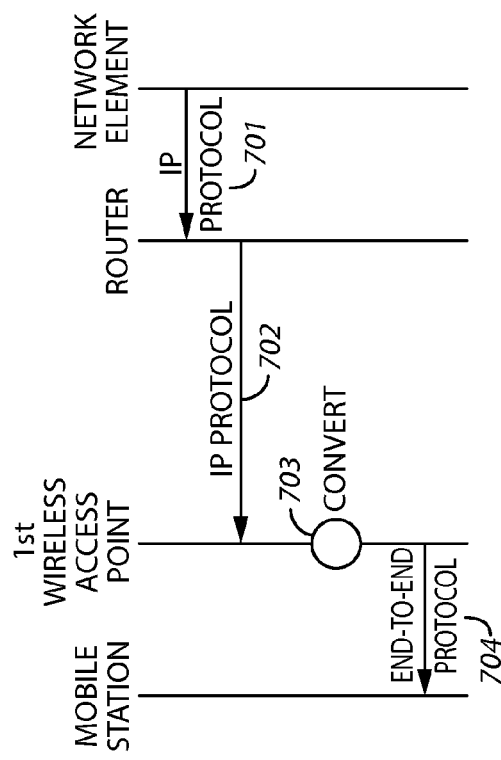
FIG. 7 comprises a signal flow diagram as configured in accordance with various embodiments of the invention.

Referring now to FIG. 7, in this last example a network element sends an Internet Protocol-based message 701 addressed to a mobile station (or, more accurately, to an Internet Protocol address held and retained by a first wireless access point on behalf of that mobile station). A network router forwards a corresponding Internet Protocol-based message 702 to the first wireless access point, possibly using a variety of techniques including Mobile-Internet Protocol based techniques. The latter uses the target Internet Protocol address to ascertain that the message is intended for the mobile station and then converts 703 that Internet Protocol-based message into a suitable end-to-end protocol-based message 704 which the wireless access point then transmits to the mobile station.

This illustrates the ease by which various network elements, programmed to support the functional needs of a mobile station population but not necessarily all of the unique protocol requirements of that group, are readily able to communicate their updates, responses, and other messages to a given mobile station via the specific and flexible operation of the wireless access points as described.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method for use with a communication network having a plurality of geographically differentiated wireless access points and which communication network supports handovers of mobile stations from one wireless access point to another wireless access point during both idle and connected modes of operation in order to support mobile station mobility, wherein the mobile stations use an end-to-end protocol for communicating directly with a counterpart network element that is hierarchically differentiated from the wireless access point, the method comprising:

receiving, at a wireless access point of the plurality of wireless access points, a communication from a mobile station of the plurality of mobile stations, which communication uses the end-to-end protocol;

converting, by the wireless access point, the communication from the end-to-end protocol to an Internet Protocol-based communication, wherein the Internet Protocol-based communication is set up by use of a surrogate Internet Address that corresponds to the mobile station, wherein the mobile station does not support Internet Protocol-based communication, to provide a converted communication, wherein the end-to-end protocol used by the communication comprises at least one of a Radio Resource Control (RRC)-compatible protocol and a Network Access Server (NAS)-compatible protocol;

routing the converted communication to a network element;

receiving, at the wireless access point, a communication directed to the mobile station from the network element using an Internet Protocol;

converting, at the wireless access point, the communication directed to the mobile station from an Internet Protocol-based communication to an end-to-end protocol-based communication that is directed to the mobile station; and wirelessly conveying the converted end-to-end protocol-based communication that is directed to the mobile station to the mobile station.

2. The method of claim 1 further comprising:

transmitting the converted communication to a hierarchically differentiated network element using an Internet Protocol.

3. The method of claim 1 further comprising:

effecting at least one of location updating as corresponds to at least one of the mobile stations and mobile station paging via a peer-to-peer communication between at least two the wireless access points.

4. The method of claim 1 further comprising:

effecting a handover of a given one of the mobile stations from a first one of the wireless access points to a second one of the wireless access points via a peer-to-peer communication between at least two the wireless access points.

5. A wireless access point for use with a communication network having a plurality of geographically differentiated wireless access points and which communication network supports handovers of mobile stations from one wireless access point to another wireless access point during both idle and connected modes of operation in order to support mobile station mobility, wherein the mobile stations use an end-to-end protocol for communicating directly with a counterpart network element that is hierarchically differentiated from the wireless access point, the wireless access point comprising:

a wireless mobile station interface that is compatible with the end-to-end protocol;

a network interface operably coupled to the wireless mobile station interface and having an Internet Protocol-compatible output operably coupled to the communication network; and an agent operably coupled between the wireless mobile station interface and the network interface, wherein the agent is configured to convert a communication received from a wireless mobile station, via the wireless mobile station interface, from an end-to-end protocol communication to an Internet Protocol-based communication, wherein the Internet Protocol-based communication is set up by use of a surrogate Internet Address that corresponds to the wireless mobile station, wherein the wireless mobile station does not support Internet Protocol-based communication, and wherein the end-to-end protocol used by the communication comprises at least one of a Radio Resource Control (RRC)-compatible protocol and a Network Access Server (NAS)-compatible protocol and route the Internet Protocol-based communication to the network interface, and convert a communication, received via the network interface, from an Internet Protocol-based communication to an end-to-end protocol communication and route the end-to-end protocol communication to the wireless mobile station interface for wireless conveyance to the wireless mobile station.

6. The wireless access point of claim 5 wherein the agent comprises a mobility agent having at least one of:
   network-side data-rerouting programming;
   wireless access point peer-to-peer mobility support programming.

7. The wireless access point of claim 5 wherein the agent comprises a voice call agent having at least one of:
   Session Initiation Protocol (SIP) voice call setup programming;
   SIP-to-over-the-air conversion of voice call control messages programming;
   Voice over Internet Protocol voice frame packing programming;
   Voice over Internet Protocol voice frame unpacking programming.

8. The wireless access point of claim 5 wherein the agent comprises mobility management means for facilitating at least one of mobile station location updating and mobile station paging via peer-to-peer interaction with another of the wireless access points of the communication network.

9. The wireless access point of claim 5 wherein the agent comprises handover means for facilitating at least one of:
   a handover of a mobile station to another of the wireless access points of the communication network;
   a location update;
   paging;
via peer-to-peer interaction with another of the wireless access points of the communication network.

10. The wireless access point of claim 5 wherein the agent comprises voice call agent means for interfacing with another network element using Session Initiation Protocol to facilitate a voice call for a mobile station.

11. A wireless access point for use with a communication network having a plurality of geographically differentiated wireless access points and which communication network supports handovers of mobile stations from one wireless access point to another wireless access point during both idle and connected modes of operation in order to support mobile station mobility, wherein the mobile stations use an end-to-end protocol for communicating directly with a counterpart network element that is hierarchically differentiated from the wireless access point, the wireless access point comprising:
   means for receiving a communication from one of the mobile stations, which communication uses the end-to-end protocol;
   means for converting the communication from the end-to-end protocol to an Internet Protocol-based communication, wherein the Internet Protocol-based communication is set up by use of a surrogate Internet Address that corresponds to one of the mobile stations, wherein the one of the mobile station does not support Internet protocol-based communication, to provide a converted communication, wherein the end-to-end protocol used by the communication comprises at least one of a Radio Resource Control (RRC)-compatible protocol and a Network Access Server (NAS)-compatible protocol;
   means for routing the Internet Protocol-based communication to a network element;
   means for converting a communication, received from a network element and intended for the one of the mobile stations, from an Internet Protocol-based communication to an end-to-end protocol communication; and
   means for wirelessly conveying the end-to-end protocol communication to the one of the mobile stations.

12. The wireless access point of claim 11 further comprising:
   means for transmitting the converted communication to a hierarchically differentiated network element using an Internet Protocol.

13. The wireless access point of claim 11 further comprising:
   means for receiving a communication directed to a mobile station from a network element using an Internet Protocol;
   means for converting the communication directed to the mobile station from an Internet Protocol-based communication to an end-to-end protocol-based communication that is directed to the mobile station.

14. The wireless access point of claim 11 further comprising:
   means for effecting at least one of:
   a handover and change of location management to a second one of the wireless access points;
   a location update; and
   paging;
via a peer-to-peer communication with the second one of the wireless access points.

* * * * *